US011121730B2

(12) United States Patent
Mori

(10) Patent No.: US 11,121,730 B2
(45) Date of Patent: Sep. 14, 2021

(54) RADIO FREQUENCY CIRCUIT, MULTIPLEXER, AND COMMUNICATION DEVICE

(71) Applicant: Murata Manufacturing Co., Ltd., Kyoto (JP)

(72) Inventor: Hirotsugu Mori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/951,111

(22) Filed: Nov. 18, 2020

(65) Prior Publication Data

US 2021/0159927 A1     May 27, 2021

(30) Foreign Application Priority Data

Nov. 21, 2019    (JP) .............................. JP2019-210069

(51) Int. Cl.
*H04B 1/00*        (2006.01)
*H04W 16/14*      (2009.01)

(52) U.S. Cl.
CPC .......... *H04B 1/0067* (2013.01); *H04W 16/14* (2013.01)

(58) Field of Classification Search
CPC ........ H04B 1/0067; H04B 1/40; H04B 1/401; H04W 16/14
See application file for complete search history.

(56) References Cited

U.S. PATENT DOCUMENTS

| 10,257,119 | B2 | 4/2019 | Wloczysiak et al. | |
|---|---|---|---|---|
| 2018/0005966 | A1 | 1/2018 | Smith et al. | |
| 2018/0294858 | A1* | 10/2018 | Pehlke | ................. H04B 7/0413 |
| 2019/0044548 | A1* | 2/2019 | Freisleben | ........... H04B 1/0057 |
| 2020/0036401 | A1* | 1/2020 | Ella | ...................... H04B 1/0057 |

OTHER PUBLICATIONS

Ericsson, Overview of Requirements for CA Between Licensed Band NR PCell and NR-U SCells, 3GPP TSG-RAN WG4 Meeting #90-Bis, Apr. 8-12, 2019, pp. 1-3, R4-1904176, Ericsson, Xi'an P.R. of China.

* cited by examiner

*Primary Examiner* — Nguyen T Vo
(74) *Attorney, Agent, or Firm* — Pearne & Gordon LLP

(57) ABSTRACT

A radio frequency circuit includes: an antenna connection terminal; a UHB transfer circuit that transfers a signal of a first frequency band including at least a part of a frequency band higher than or equal to 3.3 GHz and under 5 GHz; a NR-U transfer circuit that transfers a signal of a second frequency band including at least a part of a frequency band higher than or equal to 6.6 GHz; and a filter having a frequency band including the first frequency band and the second frequency band as a passband. The filter is disposed between the antenna connection terminal and a connection node of the UHB transfer circuit and the NR-U transfer circuit.

12 Claims, 7 Drawing Sheets

RADIO FREQUENCY CIRCUIT, MULTIPLEXER, AND COMMUNICATION DEVICE

CROSS REFERENCE TO RELATED APPLICATION

The present application is based on and claims priority of Japanese Patent Application No. 2019-210069 filed on Nov. 21, 2019. The entire disclosure of the above-identified application, including the specification, drawings, and claims, is incorporated herein by reference in its entirety.

TECHNICAL FIELD

The present disclosure relates to radio frequency circuits, multiplexers, and communication devices.

BACKGROUND

Use and application of a frequency band that can be used without obtaining a radio station license (hereinafter referred to as an unlicensed band) in a mobile communication system used in, for example, mobile phones, is being considered. For example, Licensed-Assisted Access (LAA) for using, in the 4th generation mobile communication system (4G), a 5 GHz unlicensed band used in wireless local area network (WLAN) communication as a Long Term Evolution (LTE) carrier is standardized in Release 13 of the 3rd Generation Partnership Project (3GPP). U.S. Pat. No. 10,257,119 discloses a front end configuration that supports LAA.

BRIEF SUMMARY

In WLAN and the 5th generation mobile communication system (5G), usage of a frequency band in an unlicensed band higher than or equal to 6 GHz is being considered, and simultaneous usage of a frequency band under 5 GHz and an unlicensed band higher than or equal to 6 GHz is also being considered. However, as recognized by the present inventor, the front end configuration disclosed in U.S. Pat. No. 10,257,119 does not support transferring a radio frequency signal of an unlicensed band higher than or equal to 6 GHz along with a radio frequency signal of a frequency band under 5 GHz.

The present disclosure provides radio frequency circuits, multiplexers, and communication devices that can transfer a radio frequency signal of an unlicensed band higher than or equal to 6 GHz along with a radio frequency signal of a frequency band under 5 GHz.

To achieve this, a radio frequency circuit according to one aspect of the present disclosure includes: an input/output terminal; a first transfer circuit configured to transfer a signal of a first frequency band, the first frequency band including at least a part of a frequency band higher than or equal to 3.3 GHz and under 5 GHz; a second transfer circuit configured to transfer a signal of a second frequency band, the second frequency band including at least a part of a frequency band higher than or equal to 6.6 GHz; and a first filter having, as a passband, a frequency band including the first frequency band and the second frequency band. The first filter is disposed between the input/output terminal and a connection node of the first transfer circuit and the second transfer circuit.

The present disclosure is capable of providing radio frequency circuits, multiplexers, and communication devices that can transfer radio frequency signals of an unlicensed band higher than or equal to 6 GHz along with a radio frequency signal of a frequency band under 5 GHz.

BRIEF DESCRIPTION OF DRAWINGS

These and other advantages and features will become apparent from the following description thereof taken in conjunction with the accompanying Drawings, by way of non-limiting examples of embodiments disclosed herein.

DETAILED DESCRIPTION OF EMBODIMENTS

Figure 1A:
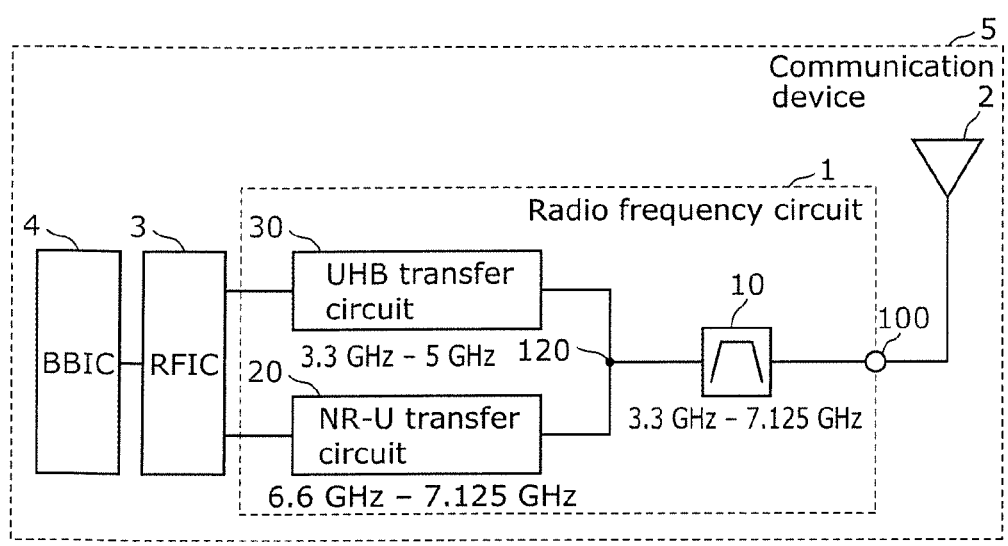
FIG. 1A illustrates a circuit configuration of a radio frequency circuit and a communication device according to an embodiment.

Hereinafter, an exemplary embodiment of the present disclosure will be described in detail with reference to the drawings. The subsequently described exemplary embodiment shows a generic or a specific example. The numerical values, shapes, materials, elements, the arrangement and connection of the elements, and others indicated in the following exemplary embodiment are mere examples, and therefore are not intended to limit the present disclosure. Among elements described in the following exemplary embodiment, those not recited in any one of the independent claims are described as optional elements. In addition, the sizes of the elements and the ratios of the sizes illustrated in the drawings are not necessarily accurate.

As used herein, a "path" refers to a transfer path including, for example, a line along which radio frequency signals propagate, an electrode directly connected to the line, and a terminal directly connected to the line or the electrode.

Embodiments

1. Circuit Configuration of Communication Device 5

FIG. 1A illustrates a circuit configuration of radio frequency circuit 1 and communication device 5 according to the embodiment. As illustrated in FIG. 1A, communication device 5 includes radio frequency circuit 1, antenna 2, RFIC 3, and BBIC 4.

Radio frequency circuit 1 transfers radio frequency signals between antenna 2 and RFIC 3. The circuit configuration of radio frequency circuit 1 will be described in greater detail later.

Antenna 2 is connected to antenna connection terminal 100 of radio frequency circuit 1, receives reception signals from outside communication device 5, and outputs the received reception signals to radio frequency circuit 1.

RFIC 3 is one example of a signal processing circuit that processes radio frequency signals received by antenna 2. More specifically, RFIC 3 performs signal processing using a down converter or the like on radio frequency signals input via radio frequency circuit 1, and outputs reception signals generated as a result of the signal processing to BBIC 4.

BBIC 4 is a baseband signal processing circuit that performs signal processing using an intermediate frequency band lower than the frequency band of radio frequency signals transferred by radio frequency circuit 1. For example, signals processed by BBIC 4 are used as image signals for displaying images or voice signals for communication via a speaker.

RFIC 3 also functions as a controller that controls the connectivity of a switch included in radio frequency circuit 1 based on the communication band used. More specifically, RFIC 3 conveys control signals for switching the connectivity of a switch included in radio frequency circuit 1 to radio frequency circuit 1. RFIC 3 further functions as a controller that controls, for example, the gain of an amplifier included in radio frequency circuit 1. More specifically, RFIC 3 conveys control signals for adjusting, for example, the gain of the amplifier to radio frequency circuit 1. Note that the controller functionality of RFIC 3 may be provided external to RFIC 3. For example, the controller functionality may be provided in BBIC 4.

In communication device 5 according to the present embodiment, antenna 2 and BBIC 4 are optional components.

2. Circuit Configuration of Radio Frequency Circuit 1

Next, the configuration of radio frequency circuit 1 will be described in greater detail.

As illustrated in FIG. 1A, radio frequency circuit 1 includes antenna connection terminal 100, filter 10, UHB transfer circuit 30, and NR-U transfer circuit 20.

Antenna connection terminal 100 is one example of an input/output terminal that receives inputs of and outputs radio frequency signals. Antenna connection terminal 100 is connected to antenna 2.

UHB transfer circuit 30 is one example of a first transfer circuit that transfers signals of a first frequency band including at least a part of a frequency band higher than or equal to 3.3 GHz and under 5 GHz. In the present embodiment, the first frequency band is the ultra-high band group (3.3 GHz to 5 GHz) of 4G-LTE and 5G-New Radio (NR). In other words, UHB transfer circuit 30 transfers signals of the ultra-high band group.

NR-U transfer circuit 20 is one example of a second transfer circuit that transfers signals of a second frequency band including at least a part of a frequency band higher than or equal to 6.6 GHz. NR-U is in the 5 GHz and higher bands of 3GPP 5G-NR, and corresponds to a U-NII communication band in the unlicensed bands stipulated by the Federal Communications Commission (FCC). In the present embodiment, for convenience, 5.15 GHz to 6.6 GHz NR-U is denoted as NR-Ux, and 6.6 GHz to 7.125 GHz NR-U is denoted as NR-Uy (6.6 GHz to 7.125). In the present embodiment, the second frequency band includes NR-Ux (5.15 GHz to 6.6 GHz) and NR-Uy (6.6 GHz to 7.125 GHz). In other words, NR-U transfer circuit 20 transfers NR-Ux and NR-Uy signals included in NR-U.

As used herein, "6.6 GHz" means approximately 6.6 GHz. In other words, 6.6 GHz includes, in addition to precisely 6.6 GHz, frequencies within a range of error which would still be recognized as essentially 6.6 GHz. This range of error is, for example, 100 MHz.

Filter 10 is one example of a first filter having a frequency band including the first frequency band and the second frequency band as a passband.

Figure 1B:
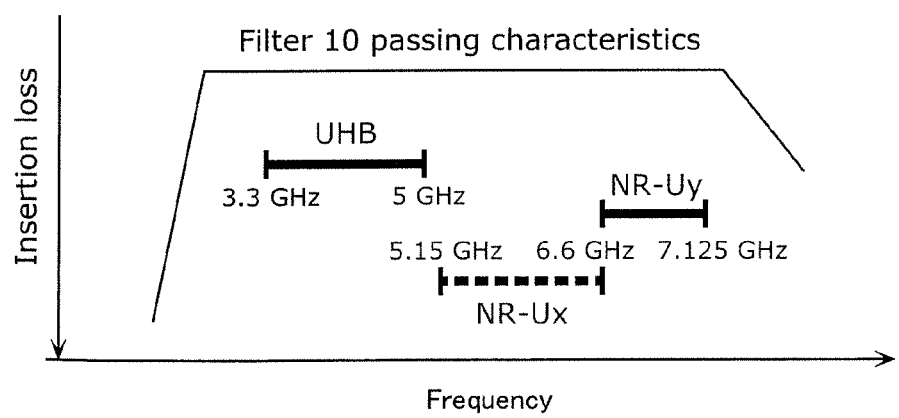
FIG. 1B illustrates one example of frequency bands included in the passband of a first filter according to the embodiment.

FIG. 1B illustrates one example of frequency bands included in the passband of filter 10 according to the present embodiment. As illustrated in FIG. 1B, the passband of filter 10 according to the present embodiment includes the ultra-high band group, NR-Ux, and NR-Uy.

As illustrated in FIG. 1A, UHB transfer circuit 30 and NR-U transfer circuit 20 are connected to connection node 120. Filter 10 is disposed between connection node 120 and antenna connection terminal 100.

Note that a switch may be disposed between UHB and NR-U transfer circuits 30 and 20 and filter 10. In such cases, a common terminal of the switch is connected to filter 10, a first selection terminal of the switch is connected to UHB transfer circuit 30, and a second selection terminal of the switch is connected to NR-U transfer circuit 20. With this connection configuration, the switch connects and disconnects filter 10 and UHB transfer circuit 30 and connects and disconnects filter 10 and NR-U transfer circuit 20. The switch may be a multi-connection switch that can simultaneously connect filter 10 to UHB transfer circuit 30 and NR-U transfer circuit 20. In the above configuration in which a switch is provided, the common terminal of the switch corresponds to connection node 120 illustrated in FIG. 1A.

With the configuration of radio frequency circuit 1 according to the present embodiment, filter 10, which is a wideband filter that passes both ultra-high band group and NR-Uy signals, is disposed between antenna connection terminal 100 and NR-U and UHB transfer circuits 20 and 30. This allows for a NR-U radio frequency signal of 6.6 GHz or higher to be transferred along with a radio frequency signal of a frequency band under 5 GHz with a low loss.

Note that NR-U transfer circuit 20 may include, for example, a power amplifier that amplifies transmission signals of a communication band belonging to the second frequency band, a low noise amplifier that amplifiers reception signals of the communication band, a filter having a passband that includes the communication band, and a switch that switches the connectivity of the filter and the transmission path and switches the connectivity of the filter and the reception path.

UHB transfer circuit 30 may include, for example, a power amplifier that amplifies transmission signals of a communication band belonging to the first frequency band, a low noise amplifier that amplifiers reception signals of the communication band, a filter having a passband that includes the communication band, and a switch that switches the connectivity of the filter and the transmission path and switches the connectivity of the filter and the reception path.

3. Circuit Configuration of Radio Frequency Circuit 1A According to Variation 1

Figure 2:
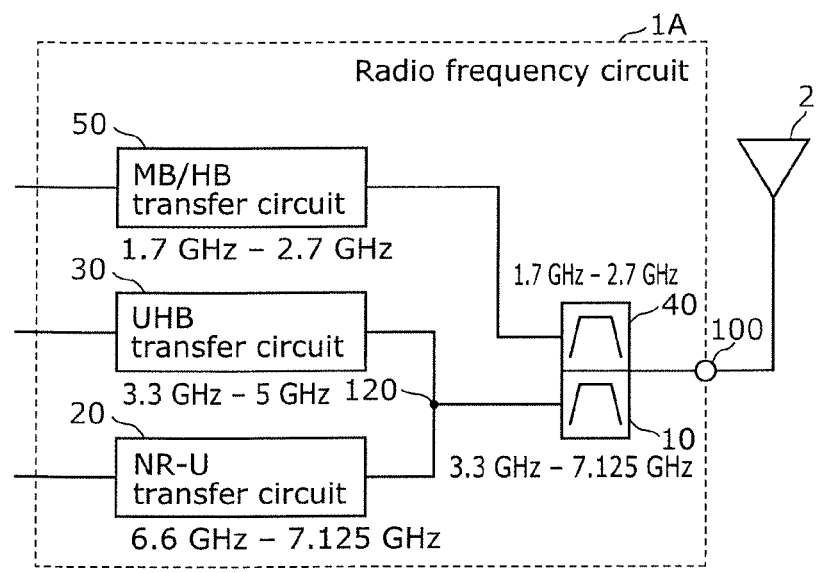
FIG. 2 illustrates a circuit configuration of a radio frequency circuit and an antenna according to Variation 1.

FIG. 2 illustrates a circuit configuration of radio frequency circuit 1A and antenna 2 according to Variation 1. As illustrated in FIG. 2, radio frequency circuit 1A includes antenna connection terminal 100, filters 10 and 40, middle band (MB)/high band (HB) transfer circuit 50, UHB transfer circuit 30, and NR-U transfer circuit 20.

Radio frequency circuit 1A according to the present variation differs from radio frequency circuit 1 according to the embodiment in regard to the additions of filter 40 and MB/HB transfer circuit 50. Hereinafter, the descriptions of common points between radio frequency circuit 1A according to the present variation and radio frequency circuit 1 according to the embodiment will be omitted; the description will focus on the points of the differences.

MB/HB transfer circuit 50 is one example of a third transfer circuit that transfers signals of a third frequency band including at least a part of a frequency band higher than or equal to 1.7 GHz and under 2.7 GHz. In the present variation, the third frequency band includes at least a part of the 4G-LTE band, the 5G-NR middle band group (1.7 GHz to 2.2 GHz) and the 5G-NR high band group (2.4 GHz to 2.7 GHz). In other words, MB/HB transfer circuit 50 transfers middle band group and high band group (2.4 GHz to 2.7 GHz) signals.

Filter 40 is one example of a second filter having a frequency band including the third frequency band as a passband and having the first frequency band and the second frequency band as an attenuation band. Filter 40 is disposed between MB/HB transfer circuit 50 and antenna connection terminal 100.

Filter 10 is one example of a first filter having a frequency band including the first frequency band and the second frequency band as a passband and having the third frequency band as an attenuation band.

With radio frequency circuit 1A configured as described above, filters 10 and 40 are capable of functioning as a diplexer that demultiplexes and multiplexes signals of the first and second frequency bands and signals of the third frequency band. Accordingly, it is possible to improve isolation when simultaneously transferring a signal of a frequency band higher than or equal to 3.3 GHz that includes the ultra-high band group and NR-Uy, and a signal of a frequency band under 3 GHz that includes the middle band group and the high band group.

The diplexer described above includes a common terminal, first and second terminals, filter 10 connected between the common terminal and the first terminal, and filter 40 connected between the common terminal and the second terminal. Note that the diplexer may be a multiplexer that includes, in addition to filters 10 and 40, another filter that is connected to the common terminal.

As described above, UHB transfer circuit 30 transfers signals conforming to 4G-LTE and signals conforming to 5G-NR. Since the modulation schemes of signals conforming to 4G-LTE and signals conforming to 5G-NR are different, the requirements on spurious emissions outside of the first frequency band are different.

As also described above, NR-U transfer circuit 20 transfers signals conforming to 4G-LTE, signals conforming to 5G-NR, and WLAN signals. Since the modulation schemes of signals conforming to 4G-LTE, signals conforming to 5G-NR, and WLAN signals are different, the requirements on spurious emissions outside of the second frequency band are different.

In other words, for example, the modulation scheme used for WLAN signals transferred by NR-U transfer circuit 20 and the modulation scheme used for signals transferred by UHB transfer circuit 30 are different. Stated differently, for example, the requirements on spurious emissions for WLAN signals transferred by NR-U transfer circuit 20 and the requirements on spurious emissions for signals transferred by UHB transfer circuit 30 are different.

The modulation scheme used for signals conforming to 4G-LTE is, for example, Single Carrier-Frequency Division Multiple Access (SC-FDMA), the modulation scheme used for signals conforming to 5G-NR is, for example, Cyclic Prefix-Orthogonal Frequency Division Multiplexing (CP-OFDM) or Discrete Fourier Transform-Spread-OFDM (DFT-s-OFDM), and the modulation scheme used for WLAN signals is, for example, OFDM.

The requirements on spurious emissions for signals conforming to 4G-LTE are specified in, for example, Technical Specification (TS) 36.101, the requirements on spurious emissions for signals conforming to 5G-NR is specified in, for example, TS 38.101, and the modulation scheme used for WLAN signals is specified in, for example, IEEE 802.11.

Accordingly, each of NR-U transfer circuit 20 and ultra-high band (UHB) transfer circuit 30 needs to have filtering characteristics for ensuring signal quality as prescribed by the various requirements on spurious emissions. However, individually providing each of the transfer circuits with filters that have passing characteristics that satisfy all of the various requirements on spurious emissions is problematic. Accordingly, filter 10 having common filtering characteristics required to satisfy the requirements on spurious emissions that the signals of NR-U transfer circuit 20 and UHB transfer circuit 30 are to satisfy is provided at connection node 120 of NR-U transfer circuit 20 and UHB transfer circuit 30. The common filtering characteristics described above are, for example, characteristics that attenuate the third frequency band. Giving filter 10 characteristics that attenuate the third frequency band makes it possible to alleviate the filtering characteristics that NR-U transfer circuit 20 and UHB transfer circuit 30 are to support.

Disposing filter 10, which has the third frequency band as an attenuation band and has the first and second frequency bands as a passband, at connection node 120 makes it possible to alleviate filtering characteristics of NR-U transfer circuit 20 and UHB transfer circuit 30 that are to be satisfied, in particular when a signal of the first and second frequency bands and a signal of the third frequency band are used simultaneously.

4. Configuration and Passing Characteristics of Filter 10

Figure 3A:
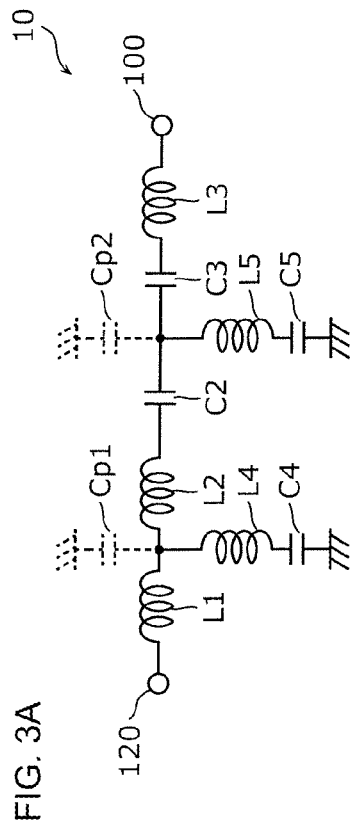
FIGS. 3A to 3C illustrate a circuit configuration of the first filter according to the embodiment and graphs of passing characteristics of the first filter according to the embodiment.
Figure 3B:
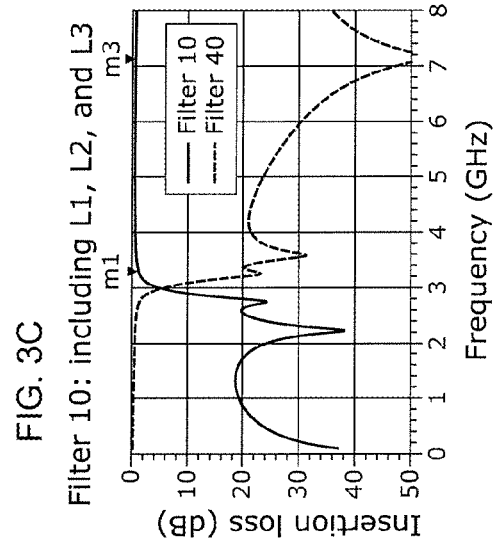
Figure 3C:
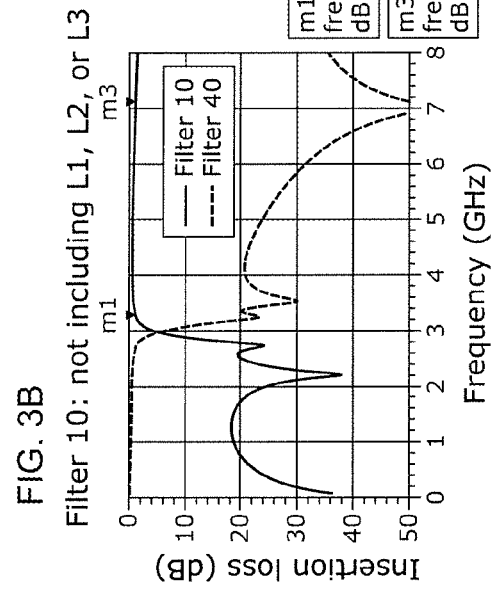

FIGS. 3A to 3C illustrate a circuit configuration of filter 10 according to the embodiment and graphs of the passing characteristics of filter 10 according to the embodiment. More specifically, FIG. 3A illustrates one example of a circuit configuration of filter 10, FIG. 3B illustrates passing characteristics (the solid line) of filter 10 that does not include inductors disposed on a series-arm path, and FIG. 3C illustrates passing characteristics (the solid line) of filter 10 that does include inductors disposed on a series-arm path. Note that FIGS. 3B and 3C also show the passing characteristics of filter 40 (the dashed lines). As illustrated in FIG. 3C, filter 10 is, for example, a high-pass filter having a frequency band including the first frequency band and the second frequency band as a passband, and filter 40 is, for example, a low-pass filter having a frequency band including the third frequency band as a passband and having the first frequency band and the second frequency band as an attenuation band.

As illustrated in FIG. 3A, filter 10 according to the present embodiment includes inductors L1, L2, L3, L4, and L5, and capacitors C2, C3, C4, and C5. In other words, filter 10 is what is commonly known as an LC filter. Inductors L1 and L2, capacitors C2 and C3, and inductor L3 are disposed in series in the listed order on the series-arm path that connects connection node 120 and antenna connection terminal 100. Inductor L2 and capacitor C2 are connected in series, and form an LC series resonance circuit. Inductor L3 and capacitor C3 are connected in series, and form an LC series resonance circuit. An LC series resonance circuit including inductor L4 and capacitor C4 connected together in series is provided in series on a parallel-arm path that connects the connection node of inductors L1 and L2 and a ground. An LC series resonance circuit including inductor L5 and capacitor C5 connected together in series is provided in series on a parallel-arm path that connects the connection node of capacitors C2 and C3 and a ground. Disposing an LC series resonance circuit on a series-arm path makes it possible to transfer radio frequency signals with a low loss in the vicinity of the resonance frequency of the LC series resonance circuit. Disposing an LC series resonance circuit on a parallel-arm path makes it possible to attenuate radio frequency signals in the vicinity of the resonance frequency of the LC series resonance circuit.

With a conventional high-pass filter, from the viewpoint of miniaturization and achieving low loss, only a capacitor is disposed on a series-arm, but in radio frequencies, parasitic capacitance makes it difficult to widen the passband. It is possible, however, to widen the passband by disposing an inductive-capacitive (LC) series resonance circuit on a series-arm. But when the inductor included in the LC series resonance circuit is a spiral inductor, the physical size of the inductor is large. When the physical size of the inductor is large, transfer loss increases. On the other hand, there is a desire to reduce the inductance value of the inductor included in the LC series resonance circuit in order to realize LC series resonance in radio frequencies.

Based on the above, the inductor included in the LC series resonance circuit is preferably a non-spiral inductor. Note that a non-spiral inductor means that the coil pattern that forms the inductor has not an L-shape or a helical shape, but rather a linear shape.

In view of this, inductor L2 included in filter 10 according to the present embodiment may be part of a connection line that connects antenna connection terminal 100 and connection node 120. In such cases, inductor L2 preferably has a linear shape.

With the passing characteristics (the solid line) of filter 10 illustrated in FIG. 3B that does not include inductors L1 through L3, insertion loss in bands of 6 GHz and above deteriorates. In contrast, with the passing characteristics (the solid line) of filter 10 illustrated in FIG. 3C that does include inductors L1 through L3, an insertion loss in bands of 6 GHz and above reduces. Accordingly, it is possible to reduce the insertion loss of filter 10 in bands higher than or equal to 6 GHz by setting the resonance frequency of the LC series resonance circuit disposed on the series-arm path to 6 GHz or higher.

In other words, the passband of filter 10 can be widened by disposing LC series resonance circuit in series on the above-described series-arm path in filter 10.

As illustrated in FIG. 3A, when each node on the series-arm path is grounded in radio frequencies via parasitic capacitance Cp1 or Cp2, the resonance characteristics of the LC series resonance circuit disposed on the series-arm path deteriorate, whereby the passing characteristics of filter 10 deteriorate.

Figure 4A:
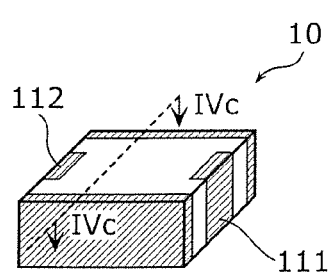
FIGS. 4A to 4C illustrate one example of a structure of the first filter according to the embodiment.
Figure 4B:
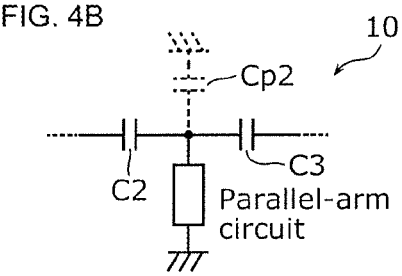
Figure 4C:
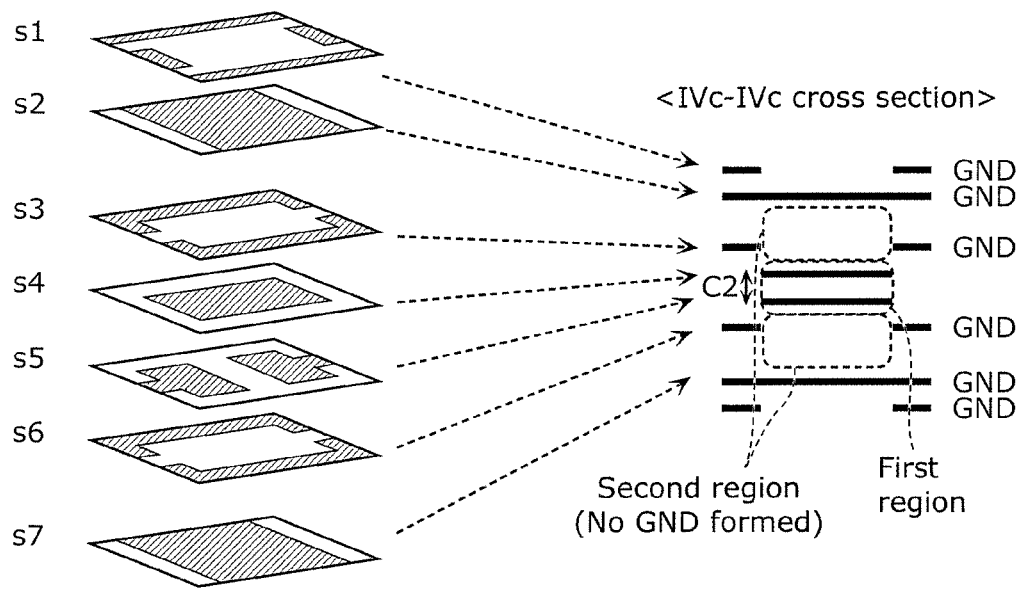

FIGS. 4A to 4C illustrate one example of a structure of filter 10 according to the embodiment. FIG. 4A is a schematic perspective view of filter 10, FIG. 4B illustrates part of the circuit configuration of filter 10, and FIG. 4C illustrates, on the left hand side, the electrode configuration of each dielectric layer included in filter 10 and illustrates, on the right hand side, a cross sectional view taken at line IVc-IVc in FIG. 4A, in the direction of the arrows in FIG. 4A.

As illustrated in FIG. 4A, input/output electrodes 111 and 112 are respectively formed on opposing side surfaces of filter 10. For example, input/output electrode 111 is connected to antenna connection terminal 100, and input/output electrode 112 is connected to connection node 120. A ground electrode is formed on side surfaces of filter 10 on which neither input/output electrode 111 nor 112 is formed.

As illustrated in FIG. 4C, filter 10 includes a stacked structure of dielectric layers s1 through s7. A planar electrode pattern is formed on each of dielectric layers s1 through s7. Each planar electrode pattern corresponds to any one of an inductor, a capacitor, a connection line, and an electrode included filter 10.

As illustrated in FIG. 4B, capacitor C2 included in LC series resonance circuit disposed on the series-arm path is realized by the planar electrode patterns formed on dielectric layers s4 and s5. Here, as illustrated in FIG. 4C, capacitor C2 is formed in a first region of dielectric layers s4 and s5 (collectively the first dielectric layer). Moreover, no ground electrode pattern is formed in a second region, which overlaps the first region in a plan view of the dielectric layers, of dielectric layers s3 and s6 (collectively the second dielectric layer) located adjacent to dielectric layers s4 and s5, respectively. Although not illustrated in FIG. 4C, capacitor C3 is also formed in dielectric layers s4 and s5.

With this configuration, the series-arm path of filter 10 can avoid being grounded in radio frequencies via, for example, parasitic capacitance Cp2, which makes it possible to reduce insertion loss on the high frequency side of the passband. In other words, it is possible to widen the passband of filter 10 on the high frequency side.

Note that inductor L2 connected in series to capacitor C2 may be formed by a line pattern that connects input/output electrode 112 and capacitor C2, and inductor L3 connected in series to capacitor C3 may be formed by a line pattern that connects input/output electrode 111 and capacitor C3.

5. Configuration and Passing Characteristics of Filter 40

Next, the configuration and passing characteristics of filter 40 according to Variation 1 will be described.

Figure 5B:
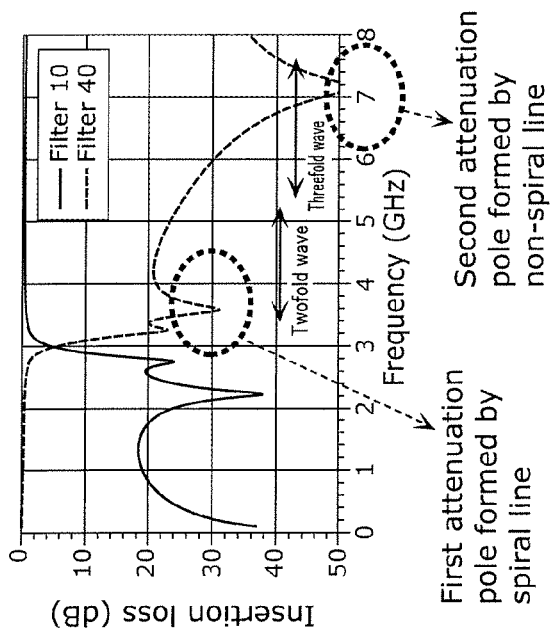
FIGS. 5A to 5B illustrate the structures of inductors of a second filter according to Variation 1 and a graph of passing characteristics of the second filter according to Variation 1.
Figure 5A:
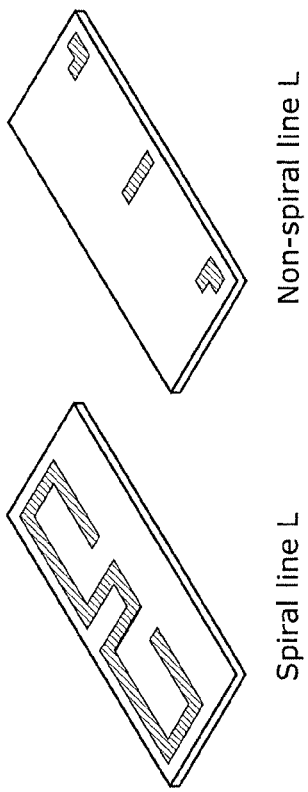

FIGS. 5A to 5B illustrate structures of inductors of filter 40 according to Variation 1 and a graph of passing characteristics of filter 40 according to Variation 1. FIG. 5A is a schematic perspective view of an inductor having a spiral structure and an inductor having a non-spiral structure, and FIG. 5B illustrates passing characteristics of filter 40 according to Variation 1 (the dashed line). Note that FIG. 5B also shows the passing characteristics of filter 10 (the solid line).

In regard to the passing characteristics of filter 40, as illustrated in FIG. 5B, the attenuation band of filter 40, which is on the high frequency side of the passband of filter 40, corresponds to the passband of filter 10, and includes frequencies that are two and three times a predetermined frequency included in the third frequency. Here, filter 40 includes a first attenuation pole at the above-described frequency that is two times the predetermined frequency (i.e., the twofold wave), and a second attenuation pole at the above-described frequency that is three times the predetermined frequency (i.e., the threefold wave).

In order to achieve the attenuation characteristics illustrated in FIG. 5B, filter 40 includes a first inductor to form the first attenuation pole and a second inductor to form the second attenuation pole. As illustrated in FIG. 5A, the first inductor is a spiral conductive coil, and the second inductor is a non-spiral conductive line.

With the above configuration of filter 40, the second and third harmonics of the above-described predetermined frequency included in the third frequency band overlap with the passband of filter 10, but attenuation poles are formed in the frequency band of these second and third harmonics. With this, in the diplexer including filters 10 and 40, the isolation when a signal of 3.3 GHz or higher and a signal under 3 GHz are simultaneously transferred can be further improved.

While the frequency of the above-described second harmonic is lower than or equal to 6 GHz whereas the frequency of the above-described third harmonic may be 6 GHz or higher, the first inductor is formed as a spiral conductive coil that can be precisely formed at 6 GHz and lower. On the other hand, the second inductor is formed as a conductive line that can be precisely formed at 6 GHz and higher. Accordingly, in filter 10 having a wide passband that is higher than or equal to 6 GHz, it is possible to highly precisely inhibit the deterioration of insertion loss caused by the attenuation characteristics of filter 40.

6. Application Example of Radio Frequency Circuit 1A According to Variation 1

Figure 6:
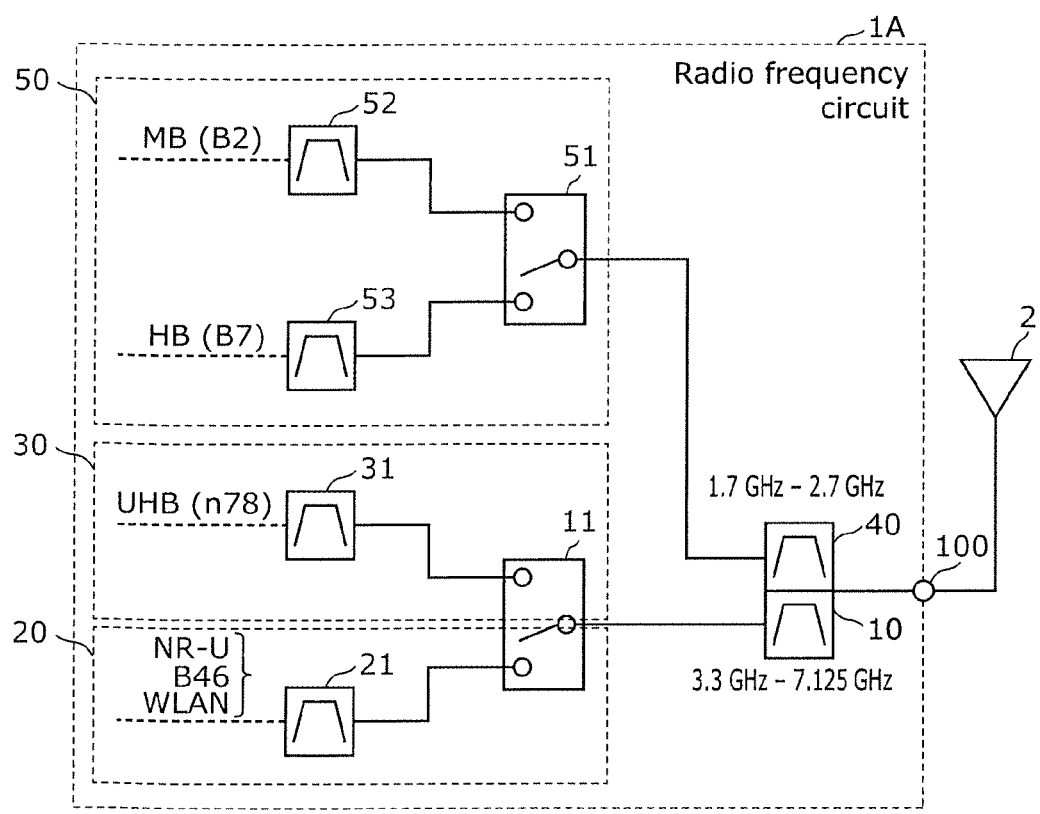
FIG. 6 illustrates a detailed circuit configuration of the radio frequency circuit according to Variation 1.

FIG. 6 illustrates a detailed circuit configuration of radio frequency circuit 1A according to Variation 1. As illustrated in FIG. 6, radio frequency circuit 1A includes antenna connection terminal 100, filters 10 and 40, MB/HB transfer circuit 50, UHB transfer circuit 30, and NR-U transfer circuit 20.

NR-U transfer circuit 20 includes switch 11 and filter 21. Filter 21 has the second frequency band as a passband. For example, NR-U transfer circuit 20 transfers NR-Uy (6.6 GHz to 7.125 GHz) signals, 4G-LTE B46 (5.15 GHz to 5.925 GHz) signals, and WLAN (5.15 GHz to 5.85 GHz) signals. In other words, the second frequency band includes 4G-LTE B46, NR-U (6.6 GHz to 7.125 GHz), and WLAN.

UHB transfer circuit 30 includes switch 11 and filter 31. Filter 31 has the first frequency band as a passband. For example, UHB transfer circuit 30 transfers signals in 5G-NR n78 (3.3 GHz to 3.8 GHz) belonging to the ultra-high band group (3.3 GHz to 5 GHz). In other words, the first frequency band includes 5G-NR n78.

Switch 11 is disposed between filters 21 and 31 and filter 10. More specifically, filter 11 includes a first common terminal, a first selection terminal, and a second selection terminal. The first common terminal is connected to filter 10, the first selection terminal is connected to filter 31, and the second selection terminal is connected to filter 21. This connection configuration allows switch 11 to connect and disconnect filter 10 and filter 31, and to connect and disconnect filter 10 and filter 21. Note that switch 11 is a multi-connection switch capable of simultaneously connecting filter 10 to both filter 31 and filter 21. The first common terminal of switch 11 corresponds to connection node 120 in radio frequency circuit 1 according to the embodiment.

Note that switch 11 need not to be a switch included in UHB transfer circuit 30 and NR-U transfer circuit 20, and may instead be a switch disposed between filter 10 and UHB transfer circuit 30 and between filter 10 and NR-U transfer circuit 20. In such cases, switch 11 connects and disconnects filter 10 and UHB transfer circuit 30 and connects and disconnects filter 10 and NR-U transfer circuit 20.

MB/HB transfer circuit 50 includes switch 51 and filters 52 and 53. For example, MB/HB transfer circuit 50 transfers signals in 4G-LTE B7 (the transmission band=2.5 GHz to 2.57 GHz, the reception band=2.62 GHz to 2.69 GHz) belonging to the high band group (2.4 GHz to 2.7 GHz), and signals in 4G-LTE B2 (the transmission band=1.85 GHz to 1.91 GHz, the reception band=1.93 GHz to 1.99 GHz) belonging to the middle band group (1.7 GHz to 2.2 GHz). In other words, the third frequency band includes a communication band belonging to the middle band group or high band group.

Filter 52 has 4G-LTE B2 as a passband, and filter 53 has 4G-LTE B7 as a passband. Filter 52 may be a duplexer including a transmission filter having the 4G-LTE B2 transmission band as a passband and a reception filter having the 4G-LTE B2 reception band as a passband. Filter 53 may be a duplexer including a transmission filter having the 4G-LTE B7 transmission band as a passband and a reception filter having the 4G-LTE B7 reception band as a passband.

Switch 51 is disposed between filters 52 and 53 and filter 40. More specifically, filter 51 includes a second common terminal, a third selection terminal, and a fourth selection terminal. The second common terminal is connected to filter 40, the third selection terminal is connected to filter 52, and the fourth selection terminal is connected to filter 53. This connection configuration allows switch 51 to connect and disconnect filter 40 and filter 52, and to connect and disconnect filter 40 and filter 53. Note that switch 51 is a multi-connection switch capable of simultaneously connecting filter 40 to both filter 52 and filter 53.

With radio frequency circuit 1A configured as described above, filters 10 and 40 are capable of functioning as a diplexer that demultiplexes and multiplexes signals of the first and second frequency bands and signals of the third frequency band. Accordingly, it is possible to improve isolation when a signal of 3.3 GHz or higher including 5G-NR n78, 4G-LTE B46, WLAN, and NR-Uy, and a signal under 3 GHz including 4G-LTE B2 and B7 are transferred simultaneously.

Note that the above configuration can achieve, for example, (1) carrier aggregation (CA) of B2 and B46, (2) CA of B2, B7, and B46, and (3) dual connectivity (DC) of B7, B46, and n78.

7. Application Example of Radio Frequency Circuit 1A According to Variation 1

Figure 7A:
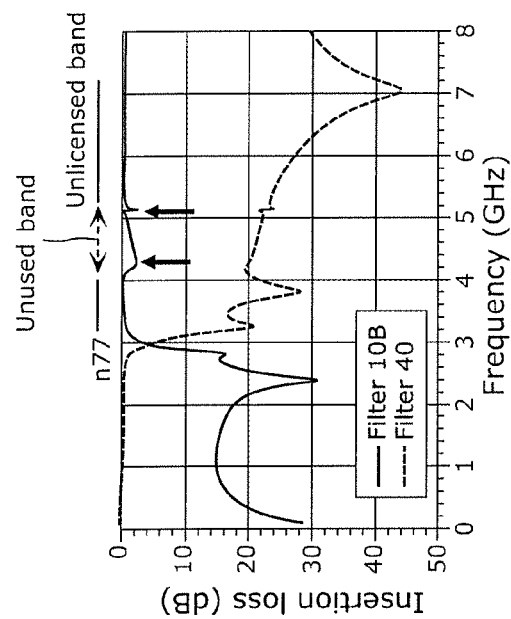
FIGS. 7A to 7B illustrate a circuit configuration of a first filter according to Variation 2 and a graph of passing characteristics of the first filter according to Variation 2.
Figure 7B:
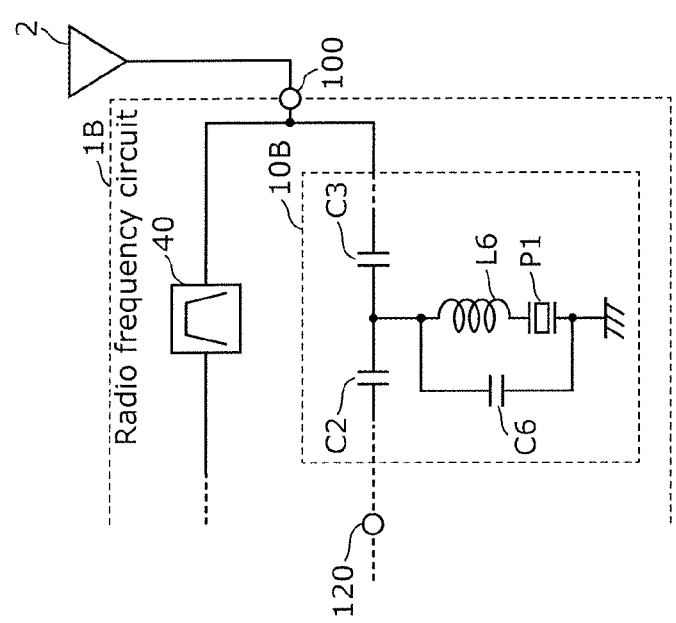

FIGS. 7A and 7B illustrate a circuit configuration of radio frequency circuit 1B according to Variation 2 and a graph of passing characteristics of filter radio frequency circuit 1B according to Variation 2. FIG. 7A illustrates a circuit configuration of radio frequency circuit 1B according to Variation 2, and FIG. 7B illustrates passing characteristics (the solid line) of filter 10B according to Variation 2. Note that FIG. 7B also shows the passing characteristics of filter 40 (the dashed line). As illustrated in FIG. 7A, radio frequency circuit 1B includes antenna connection terminal 100, filters 10B and 40, MB/HB transfer circuit 50 (illustration omitted), UHB transfer circuit 30 (illustration omitted), and NR-U transfer circuit 20 (illustration omitted). Radio frequency circuit 1B according to the present variation differs from radio frequency circuit 1A according to Variation 1 in regard to the circuit configuration of filter 10B. Hereinafter, the descriptions of common points between radio frequency circuit 1B according to the present variation and radio frequency circuit 1A according to Variation 1 will be omitted; the description will focus on the points of the differences.

Filter 10B is one example of a first filter having a frequency band including the first frequency band and the second frequency band as a passband. Filter 10B is disposed between connection node 120 and antenna connection terminal 100. Filter 10B includes inductors L1 (illustration omitted), L2 (illustration omitted), L3 (illustration omitted), L4 (illustration omitted), and L6, capacitors C2, C3, C4 (illustration omitted), and C6, and acoustic wave resonator P1. Inductors L1 and L2, capacitors C2 and C3, and inductor L3 are disposed in series in the listed order on the series-arm path that connects connection node 120 and antenna connection terminal 100. A circuit, in which capacitor C6 and a series connection circuit of inductor L6 and acoustic wave resonator P1 are connected in parallel, is disposed in series on the parallel-arm path that connects the connection node of capacitor C2 and capacitor C3 with a ground.

By disposing acoustic wave resonator P1 on the parallel-arm path, the steepness (the attenuation slope) at the low frequency edge of the passband can be increased, as illustrated in FIG. 7B. However, a spurious wave occurs in a band of frequencies higher than the antiresonant frequencies of acoustic wave resonator P1. Since the passband of filter 10B is wide, the frequency at which the spurious wave occurs is within the passband.

In view of this, with radio frequency circuit 1B according to the present variation, the frequency of the spurious wave produced by acoustic wave resonator P1 is set so as to be included in an unused band in the passband of filter 10B. For example, when NR-U transfer circuit 20 is a circuit that transfers 5G-NR n77 (3.3 GHz to 4.2 GHz) signals and NR-U (5.15 GHz to 7.125 GHz) signals, the frequency band from 4.2 GHz to 5.15 GHz is an unused band. In this case, the frequency of the spurious wave produced by acoustic wave resonator P1 is set so as to be included in the frequency band from 4.2 GHz to 5.15 GHz.

With this configuration, it is possible to increase the steepness at the low frequency edge of the passband of filter 10B with acoustic wave resonator P1. On the other hand, although a spurious wave caused by acoustic wave resonator P1 occurs in the passband of filter 10B, since the frequency of this spurious wave is in an unused band, the radio frequency signal transfer characteristics of radio frequency circuit 1B can be inhibited from deteriorating.

Radio frequency circuit 1 according to the embodiment includes: antenna connection terminal 100; UHB transfer circuit 30 configured to transfer a signal of a first frequency band including at least a part of a frequency band higher than or equal to 3.3 GHz and under 5 GHz; NR-U transfer circuit 20 configured to transfer a signal of a second frequency band including at least a part of a frequency band higher than or equal to 6.6 GHz; and filter 10 having a frequency band including the first frequency band and the second frequency band as a passband. Filter 10 is disposed between antenna connection terminal 100 and connection node 120 of UHB transfer circuit 30 and NR-U transfer circuit 20.

With this configuration, since filter 10, which passes both first frequency band signals and second frequency band signals, is disposed between antenna connection terminal 100 and UHB and NR-U transfer circuits 30 and 20, an NR-U radio frequency signal of 6 GHz or higher can be transferred along with a radio frequency signal of a frequency band under 5 GHz with a low loss.

Moreover, as with radio frequency circuit 1A according to Variation 1, the radio frequency circuit may further include switch 11 disposed between filter 10 and UHB transfer circuit 30 and between filter 10 and NR-U transfer circuit 20. Switch 11 may be configured to connect and disconnect filter 10 and UHB transfer circuit 30, and to connect and disconnect filter 10 and NR-U transfer circuit 20.

With this configuration, when either a signal of UHB transfer circuit 30 or a signal of NR-U transfer circuit 20 is selected and transferred, isolation between UHB transfer circuit 30 and NR-U transfer circuit 20 can be improved.

Radio frequency circuit 1A according to Variation 1 may further include: MB/HB transfer circuit 50 configured to transfer a signal of a third frequency band, the third frequency band including at least a part of a frequency band higher than or equal to 1.7 GHz and lower than or equal to 2.7 GHz; and filter 40 having, as a passband, a frequency band including the third frequency band and having, as an attenuation band, the first frequency band and the second frequency band. Filter 40 is disposed between MB/HB transfer circuit 50 and antenna connection terminal 100, and filter 10 has the third frequency band as an attenuation band.

With this configuration, filters 10 and 40 are capable of functioning as a diplexer that demultiplexes and multiplexes signals of the first and second frequency bands and signals of the third frequency band. Accordingly, isolation when a signal of 3.3 GHz or higher and a signal under 3 GHz are simultaneously transferred can be improved.

In radio frequency circuit 1A according to Variation 1, filter 40 may include: a first inductor in a form of a spiral conductive coil; and a second inductor in a form of a non-spiral conductive line. The attenuation band of filter 40 may include a frequency that is two times a predetermined frequency and a frequency that is three times the predetermined frequency, the predetermined frequency being included in the third frequency band. The first inductor may form a first attenuation pole at the frequency that is two times the predetermined frequency, and the second inductor may form a second attenuation pole at the frequency that is three times the predetermined frequency.

With this configuration, the second and third harmonics of the predetermined frequency included in the third frequency band overlap with passband of the first filter, but since attenuation poles are formed in the frequency band of the second and third harmonics, isolation when a signal of 3.3 GHz or higher and a signal under 3 GHz are simultaneously transferred in the diplexer including filters 10 and 40 can be further improved. While the frequency of the above-described second harmonic is lower than or equal to 6 GHz whereas the frequency of the above-described third harmonic may be 6 GHz or higher, the first inductor is formed as a spiral conductive coil that can be precisely formed at 6 GHz and lower, and the second inductor is formed as a conductive line that can be precisely formed at 6 GHz and higher. Accordingly, in the first filter having a wide passband that is higher than or equal to 6 GHz, it is possible to highly precisely inhibit the deterioration of insertion loss caused by the attenuation characteristics of the second filter.

At least one of modulation schemes of signals transferred by NR-U transfer circuit 20 may be different than any of modulation schemes of signals transferred by UHB transfer circuit 30.

At least one of requirements on spurious emissions of signals transferred by NR-U transfer circuit 20 may be different than any of requirements on spurious emissions of signals transferred by UHB transfer circuit 30.

With this configuration, each of NR-U transfer circuit 20 and UHB transfer circuit 30 needs to have filtering characteristics for ensuring signal quality as prescribed by the various requirements on spurious emissions. However, individually providing each of the transfer circuits with filters that have passing characteristics that satisfy all of the various requirements on spurious emissions is problematic. Accordingly, filter 10 having common filtering characteristics required to satisfy the requirements on spurious emissions that the signals of NR-U transfer circuit 20 and UHB transfer circuit 30 are to satisfy is provided at connection node 120. Accordingly, giving filter 10 characteristics that attenuate the third frequency band makes it possible to alleviate filtering characteristics that NR-U transfer circuit 20 and UHB transfer circuit 30 are to support.

The first frequency band may include a communication band belonging to an ultra-high band group, the ultra-high band group ranging from 3.3 GHz to 5 GHz, the second frequency band may include 4G-LTE B46, NR-U, and WLAN, the NR-U ranging from 6.6 GHz to 7.125 GHz, and the third frequency band may include a communication band belonging to a middle band group or a high band group, the middle band group ranging from 1.7 GHz to 2.2 GHz, and the high band group ranging from 2.3 GHz to 2.7 GHz.

In radio frequency circuit 1 according to the embodiment, filter 10 may be disposed in series on a series-arm path connecting connection node 120 and antenna connection terminal 100, and may include an LC series resonance circuit including an inductor and a capacitor.

With this configuration, filter 10 has a passband including a resonance frequency of the LC series resonance circuit. Accordingly, it is possible to realize a filter having a wide passband including the first frequency band and the second frequency band.

Filter 10 preferably includes a stacked structure of a plurality of dielectric layers. A first region of a first dielectric layer included in the plurality of dielectric layers preferably includes an electrode pattern of the series-arm path and the LC series resonance circuit, and a second region of a second dielectric layer that is included in the plurality of dielectric layers and adjacent to the first dielectric layer is preferably void of a ground electrode pattern. The second region overlaps the first region in a plan view of the second dielectric layer.

With this configuration, the series-arm path of filter 10 can avoid being grounded in radio frequencies, which makes it possible to reduce insertion loss on the high frequency side of the passband. In other words, it is possible to widen the passband of filter 10 on the high frequency side.

Filter 10 may further include an acoustic wave resonator disposed on a parallel-arm path connecting the series-arm path and a ground, and a frequency of a spurious wave generated by the acoustic wave resonator may be included in an unused band in the passband of filter 10.

With this configuration, it is possible to increase the steepness at the low frequency edge of the passband of filter 10 with the acoustic wave resonator. Moreover, although the acoustic wave resonator produces a ripple in the passband of filter 10, the frequency of the ripple is included in an unused band, so it does not affect the transfer characteristics of radio frequency signals.

A multiplexer according to the embodiment includes: a common terminal; a first terminal; a second terminal; filter 10; and filter 40. Filter 10 is connected between the common terminal and the first terminal, and has a frequency band including a first frequency band and a second frequency band as a passband, the first frequency band including at least a part of a frequency band higher than or equal to 3.3 GHz and under 5 GHz, the second frequency band including at least a part of a frequency band higher than or equal to 6.6 GHz. Filter 40 is connected between the common terminal and the second terminal, and has a frequency band including a third frequency band as a passband and has the first frequency band and the second frequency band as an attenuation band, the third frequency band including at least a part of a frequency band higher than or equal to 1.7 GHz and lower than or equal to 2.7 GHz. Filter 10 includes a stacked structure of a plurality of dielectric layers. A first region of a first dielectric layer included in the plurality of dielectric layers includes an electrode pattern of a series-arm path and an LC series resonance circuit, and a second region of a second dielectric layer that is included in the plurality of dielectric layers and adjacent to the first dielectric layer is void of a ground electrode pattern. The second region overlaps the first region in a plan view of the second dielectric layer. Filter 40 includes: a first inductor in a form of a spiral conductive coil; and a second inductor in a form of a non-spiral conductive line. The attenuation band of filter 40 includes a frequency that is two times a predetermined frequency and a frequency that is three times the predetermined frequency, the predetermined frequency being included in the third frequency band. The first inductor forms a first attenuation pole at the frequency that is two times the predetermined frequency, and the second inductor forms a second attenuation pole at the frequency that is three times the predetermined frequency.

With this configuration, the diplexer is capable of demultiplexing and multiplexing signals of the first and second frequency bands and signals of the third frequency band. Accordingly, isolation when a signal of 3.3 GHz or higher and a signal under 3 GHz are simultaneously transferred can be improved. Moreover, since attenuation poles are formed in the frequency bands of the second and third harmonics, the isolation when a signal of 3.3 GHz or higher and a signal under 3 GHz are simultaneously transferred in the diplexer can be further improved. Moreover, the first inductor is formed as a spiral conductive coil that can be precisely formed at 6 GHz and lower, and the second inductor is formed as a conductive line that can be precisely formed at 6 GHz and higher. Accordingly, in filter 10 having a wide passband that is higher than or equal to 6 GHz, it is possible to highly precisely inhibit the deterioration of insertion loss caused by the attenuation characteristics of filter 40. Moreover, the series-arm path of filter 10 can avoid being grounded in radio frequencies, which makes it possible to reduce insertion loss on the high frequency side of the passband. In other words, it is possible to widen the passband of filter 10 on the high frequency side.

Communication device 5 according to the embodiment includes: antenna 2; RFIC 3 configured to process radio frequency signals transmitted and received by antenna 2; and radio frequency circuit 1 configured to transfer the radio frequency signals between antenna 2 and RFIC 3.

With this configuration, it is possible to provide communication device 5 that can transfer a radio frequency signal of an unlicensed band higher than or equal to 6 GHz along with a radio frequency signal of a frequency band under 5 GHz.

Other Embodiments

Although the radio frequency circuit, the multiplexer, and the communication device according to the present disclosure have been described above by way of embodiments and variations, the present disclosure is not limited to the above embodiments and variations. The present disclosure also includes other embodiments realized by combining any elements in the above embodiments and variations, variations obtained by making various modifications to the above embodiments and variations that can be conceived by a person of ordinary skill in the art without departing from the scope of the present disclosure, and various devices that include the radio frequency circuit, the multiplexer, and the communication device according to the present disclosure.

For example, a matching element such as an inductor or a capacitor, or a switch circuit may be connected between circuit elements in the radio frequency circuit, the multiplexer, and the communication device according to the above embodiments and variations. Note that an inductor may include a line inductor implemented as a line that joins circuit elements.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

The present disclosure can be widely used in communication devices such as a mobile phone, as a radio frequency circuit, multiplexer, and communication device that are applicable to a multi-band system including an unlicensed band higher than or equal to 5 GHz.

The invention claimed is:

1. A radio frequency circuit, comprising:
an input/output terminal;
a first transfer circuit configured to transfer a signal of a first frequency band, the first frequency band including at least a part of a frequency band higher than or equal to 3.3 GHz and under 5 GHz;
a second transfer circuit configured to transfer a signal of a second frequency band, the second frequency band including at least a part of a frequency band higher than or equal to 6.6 GHz; and
a first filter having, as a passband, a frequency band including the first frequency band and the second frequency band,
wherein the first filter is disposed between the input/output terminal and a connection node of the first transfer circuit and the second transfer circuit.

2. The radio frequency circuit of claim 1, further comprising:
a switch disposed between the first filter and the first transfer circuit and between the first filter and the second transfer circuit, the switch being configured to connect and disconnect the first filter and the first transfer circuit, and to connect and disconnect the first filter and the second transfer circuit.

3. The radio frequency circuit of claim 1, further comprising:
a third transfer circuit configured to transfer a signal of a third frequency band, the third frequency band including at least a part of a frequency band higher than or equal to 1.7 GHz and lower than or equal to 2.7 GHz; and
a second filter having, as a passband, a frequency band including the third frequency band and having, as an attenuation band, the first frequency band and the second frequency band,
wherein the second filter is disposed between the third transfer circuit and the input/output terminal, and
the first filter has the third frequency band as an attenuation band.

4. The radio frequency circuit of claim 3,
wherein the second filter includes:
a first inductor in a form of a spiral conductive coil; and
a second inductor in a form of a non-spiral conductive line,
the attenuation band of the second filter includes a frequency that is two times a predetermined frequency and a frequency that is three times the predetermined frequency, the predetermined frequency being included in the third frequency band,
the first inductor forms a first attenuation pole at the frequency that is two times the predetermined frequency, and
the second inductor forms a second attenuation pole at the frequency that is three times the predetermined frequency.

5. The radio frequency circuit of claim 3,
wherein at least one of modulation schemes of signals transferred by the second transfer circuit is different than any of modulation schemes of signals transferred by the first transfer circuit.

6. The radio frequency circuit of claim 3,
wherein at least one of requirements on spurious emissions of signals transferred by the second transfer circuit is different than any of requirements on spurious emissions of signals transferred by the first transfer circuit.

7. The radio frequency circuit of claim 3,
wherein the first frequency band includes a communication band belonging to an ultra-high band group, the ultra-high band group ranging from 3.3 GHz to 5 GHz,
the second frequency band includes 4G-LTE B46, NR-U, and WLAN, the NR-U ranging from 6.6 GHz to 7.125 GHz, and
the third frequency band includes a communication band belonging to a middle band group or a high band group, the middle band group ranging from 1.7 GHz to 2.2 GHz, and the high band group ranging from 2.3 GHz to 2.7 GHz.

8. The radio frequency circuit of claim 1,
wherein the first filter is disposed in series on a series-arm path connecting the connection node and the input/output terminal, and includes an LC series resonance circuit including an inductor and a capacitor.

9. The radio frequency circuit of claim 8,
wherein the first filter includes a stacked structure of a plurality of dielectric layers,
a first region of a first dielectric layer included in the plurality of dielectric layers includes an electrode pattern of the series-arm path and the LC series resonance circuit, and
a second region of a second dielectric layer that is included in the plurality of dielectric layers and adjacent to the first dielectric layer is void of a ground electrode pattern, the second region overlapping the first region in a plan view of the second dielectric layer.

10. The radio frequency circuit of claim 8,
wherein the first filter further includes an acoustic wave resonator disposed on a parallel-arm path connecting the series-arm path and a ground, and
a frequency of a spurious wave generated by the acoustic wave resonator is included in an unused band in the passband of the first filter.

11. A communication device, comprising:
an antenna;
a radio frequency (RF) signal processing circuit configured to process radio frequency signals transmitted and received by the antenna; and
the radio frequency circuit of claim 1 configured to transfer the radio frequency signals between the antenna and the RF signal processing circuit.

12. A multiplexer, comprising:
a common terminal;
a first terminal;
a second terminal;
a first filter connected between the common terminal and the first terminal, and having a frequency band including a first frequency band and a second frequency band as a passband, the first frequency band including at least a part of a frequency band higher than or equal to 3.3 GHz and under 5 GHz, the second frequency band including at least a part of a frequency band higher than or equal to 6.6 GHz; and a second filter connected between the common terminal and the second terminal, and having a frequency band including a third frequency band as a passband and having the first frequency band and the second frequency band as an attenuation band, the third frequency band including at least a part of a frequency band higher than or equal to 1.7 GHz and lower than or equal to 2.7 GHz, wherein the first filter includes a stacked structure of a plurality of dielectric layers, a first region of a first dielectric layer included in the plurality of dielectric layers includes an electrode pattern of a series-arm path and an LC series resonance circuit, a second region of a second dielectric layer that is included in the plurality of dielectric layers and adjacent to the first dielectric layer is void of a ground electrode pattern, the second region overlapping the first region in a plan view of the second dielectric layer, the second filter includes:
  a first inductor in a form of a spiral conductive coil; and
  a second inductor in a form of a non-spiral conductive line, the attenuation band of the second filter includes a frequency that is two times a predetermined frequency and a frequency that is three times the predetermined frequency, the predetermined frequency being included in the third frequency band, the first inductor forms a first attenuation pole at the frequency that is two times the predetermined frequency, and the second inductor forms a second attenuation pole at the frequency that is three times the predetermined frequency.

* * * * *